(12) United States Patent
Webber (10) Patent No.: US 7,188,862 B2
(45) Date of Patent: Mar. 13, 2007

(54) APPARATUS AND METHOD FOR CONTROLLING AN INFLATABLE CUSHION

(75) Inventor: James L. Webber, Shelby Township, MI (US)

(73) Assignee: Delphi Technologies, Inc, Troy, MI (US)

( * ) Notice: Subject to any disclaimer, the term of this patent is extended or adjusted under 35 U.S.C. 154(b) by 442 days.

(21) Appl. No.: 10/802,394

(22) Filed: Mar. 17, 2004

(65) Prior Publication Data

US 2005/0206143 A1 Sep. 22, 2005

(51) Int. Cl.
B60R 21/233 (2006.01)
(52) U.S. Cl. .................. 280/729; 280/743.2
(58) Field of Classification Search ........... 280/729, 280/743.1, 743.2
See application file for complete search history.

(56) References Cited

U.S. PATENT DOCUMENTS

| | | | | |
|---|---|---|---|---|
| 3,883,154 A * | 5/1975 | McCullough et al. | ...... | 280/735 |
| 5,303,951 A * | 4/1994 | Goestenkors et al. | .... | 280/728.3 |
| 5,542,695 A * | 8/1996 | Hanson | ...... | 280/729 |
| 5,762,367 A | 6/1998 | Wolanin | ...... | 280/736 |
| 5,799,974 A | 9/1998 | Honda | ...... | 280/739 |
| 5,887,894 A | 3/1999 | Castagner et al. | ...... | 280/743.2 |
| 5,941,559 A * | 8/1999 | Rudolf et al. | ...... | 280/729 |
| 5,954,361 A * | 9/1999 | Lang | ...... | 280/743.2 |
| 5,957,490 A | 9/1999 | Sinnhuber | ...... | 280/735 |
| 6,161,866 A | 12/2000 | Ryan et al. | ...... | 280/736 |
| 6,203,061 B1 | 3/2001 | Niederman et al. | ...... | 280/736 |
| 6,213,502 B1 | 4/2001 | Ryan et al. | ...... | 280/736 |
| 6,247,726 B1 | 6/2001 | Ryan | ...... | 280/739 |
| 6,308,983 B1 | 10/2001 | Sinnhuber | ...... | 280/735 |
| 6,371,517 B1 | 4/2002 | Webber et al. | ...... | 280/736 |
| 6,390,501 B1 | 5/2002 | Grieb et al. | ...... | 280/743.2 |
| 6,409,213 B2 | 6/2002 | Webber et al. | ...... | 280/739 |
| 6,422,597 B1 | 7/2002 | Pinsenschaum et al. | .... | 280/735 |
| 6,431,596 B1 | 8/2002 | Ryan et al. | ...... | 280/739 |
| 6,439,603 B2 | 8/2002 | Damman et al. | ...... | 280/736 |
| 6,454,300 B1 | 9/2002 | Dunkle et al. | ...... | 280/742 |
| 6,499,765 B2 | 12/2002 | Hawthorn et al. | ...... | 280/743.1 |
| 6,511,094 B2 | 1/2003 | Thomas et al. | ...... | 280/743.2 |
| 6,561,545 B2 | 5/2003 | Grieb et al. | ...... | 280/743.2 |

(Continued)

FOREIGN PATENT DOCUMENTS

DE 3618060 12/1987

(Continued)

*Primary Examiner*—Paul N. Dickson
*Assistant Examiner*—Laura B. Rosenberg
(74) *Attorney, Agent, or Firm*—Jimmy L. Funke (57) ABSTRACT

An air bag device, comprising: an inflatable cushion being configured for deployment from the air bag device; an inflator for inflating the inflatable cushion, the inflator being in fluid communication with the inflatable cushion, the inflator comprising a first initiator for initiating a first stage of inflation and a second initiator for use with the first initiator for initiating a second stage of inflation, the first stage of inflation providing a first inflation output to the inflatable cushion; and a deployable member disposed within the inflatable cushion, the deployable member being in fluid communication with the inflator, wherein the first stage of inflation causes the deployable member to deploy in a first direction; wherein unobstructed deployment of the deployable member in the first direction will cause a signal to be sent to the second initiator to initiate the second stage of inflation.

18 Claims, 8 Drawing Sheets

U.S. PATENT DOCUMENTS

| | | |
|---|---|---|
| 6,592,146 B2 | 7/2003 | Pinsenschaum et al. ... 280/743.2 |
| 6,598,903 B2 * | 7/2003 | Okada et al. ............ 280/743.2 |
| 6,616,184 B2 | 9/2003 | Fischer .................... 280/743.2 |
| 6,796,578 B2 * | 9/2004 | White et al. ................. 280/735 |
| 6,918,611 B1 * | 7/2005 | Winters et al. ............. 280/735 |
| 2002/0020990 A1 * | 2/2002 | Sinnhuber et al. .......... 280/729 |
| 2003/0155756 A1 | 8/2003 | Hawthorn et al. .......... 280/739 |
| 2004/0012179 A1 | 1/2004 | Hawthorn et al. .......... 280/739 |
| 2004/0012180 A1 | 1/2004 | Hawthorn et al. .......... 280/739 |
| 2004/0051285 A1 | 3/2004 | Fischer ....................... 280/739 |

FOREIGN PATENT DOCUMENTS

| | | |
|---|---|---|
| DE | 19912369 A1 | 10/2000 |
| EP | 1112902 A2 | 7/2001 |
| EP | 1112902 A3 | 7/2001 |
| GB | 2338214 A | 12/1999 |

* cited by examiner

APPARATUS AND METHOD FOR CONTROLLING AN INFLATABLE CUSHION

TECHNICAL FIELD

This present invention relates generally to airbags or inflatable cushions for vehicles. More specifically, the present invention relates to systems and methods for controlling the deployment of an inflatable cushion of an airbag module.

BACKGROUND

Airbag modules have become common in modern automobiles. An airbag module typically comprises an inflatable cushion and an inflator within a housing. The module is installed in a desired position within the vehicle, such as the steering wheel, the dashboard, the seat, vehicle doors, the A-pillar, and other locations. The inflatable cushion is stored in a folded position within the housing in fluid communication with the inflator. In response to an activation event or occurrence, a sensor provides a signal for activating the inflator. The inflator provides a supply of inflating gas to the cushion to inflate the cushion, deploying it from the housing into the vehicle.

Various methods have been employed to tie the inflation level of the inflatable cushion to specific conditions.

Accordingly, it is desirable to provide an airbag module with an apparatus or system that can provide a signal to vary the inflation rate or venting rate of the airbag module.

SUMMARY

Disclosed herein is a device and method for manipulating the deployment characteristics of an inflatable cushion of an airbag module.

An air bag device for use in a vehicle is provided. The air bag device, comprising: an inflatable cushion being configured for deployment from the air bag device; an inflator for inflating the inflatable cushion, the inflator being in fluid communication with the inflatable cushion, the inflator comprising a first initiator for initiating a first stage of inflation and a second initiator for use with the first initiator for initiating a second stage of inflation, the first stage of inflation providing less inflator output to the inflatable cushion than the second stage of inflation; and a deployable member disposed within the inflatable cushion, the deployable member being in fluid communication with the inflator, wherein the first stage of inflation causes the deployable member to deploy in a first direction; wherein unobstructed deployment of the deployable member in the first direction will cause a signal to be sent to the second initiator to initiate the second stage of inflation.

An air bag module, having a housing; an inflatable cushion being configured for deployment from the housing; an inflator for inflating the inflatable cushion, the inflator being in fluid communication with the inflatable cushion, the inflator comprising a first initiator for initiating a first stage of inflation and a second initiator for use with the first initiator for initiating a second stage of inflation, the first stage of inflation providing a first inflator output to the inflatable cushion; a deployable member disposed within the inflatable cushion, the deployable member being in fluid communication with the inflator, wherein the first stage of inflation causes the deployable member to deploy in a first direction; and a securement member disposed about the inflator, the securement member securing the deployable member to the housing; wherein unobstructed deployment of the deployable member in the first direction will cause a signal to be sent to the second initiator to initiate the second stage of inflation.

A method for determining whether a portion of an inflatable cushion is obstructed during deployment, the method comprising: providing an inflator for inflating the inflatable cushion, the inflator having a first initiator for initiating a first stage of inflation and a second initiator for use with the first initiator for initiating a second stage of inflation, the first stage of inflation providing a first inflator output to the inflatable cushion; deploying a deployable member in a first direction during the first stage of inflation, the deployable member being disposed within the inflatable cushion, the deployable member being in fluid communication with the inflator; and providing a signal to the second initiator to initiate the second stage of inflation, wherein the signal is only provided if the deployable member deploys unobstructed in the first direction.

The above-described and other features of the present application will be appreciated and understood by those skilled in the art from the following detailed description, drawings, and appended claims.

DESCRIPTION OF EXEMPLARY EMBODIMENTS

Disclosed herein is a method and apparatus for selectively controlling the deployment or inflation of an inflatable cushion of an airbag module through the use of a deployable member disposed within the inflatable cushion. In accordance with an exemplary embodiment, an inflator inflates the deployable member and the inflatable cushion. The inflator comprises a first initiator for initiating a first stage of inflation and a second initiator for use with the first initiator for initiating a second stage of inflation, the first stage of inflation providing a first inflator output to the inflatable cushion. The inflator inflates the deployable member during the first stage of inflation wherein the deployable member deploys in a first direction, wherein unobstructed deployment of the deployable member in the first direction will cause a signal to be ultimately sent to the second initiator to initiate the second stage of inflation. If, however, the deployable member does not deploy in an unobstructed manner no activation signal will be sent to the second initiator and only the first initiator will be fired.

In accordance with an exemplary embodiment the inflator is a dual stage inflator capable of providing two inflation outputs at selected times. Non-limiting examples of exemplary inflators include but are not limited to pure gas inflators, hybrid inflators, pyrotechnic inflators, and equivalents thereof.

Figure 1:
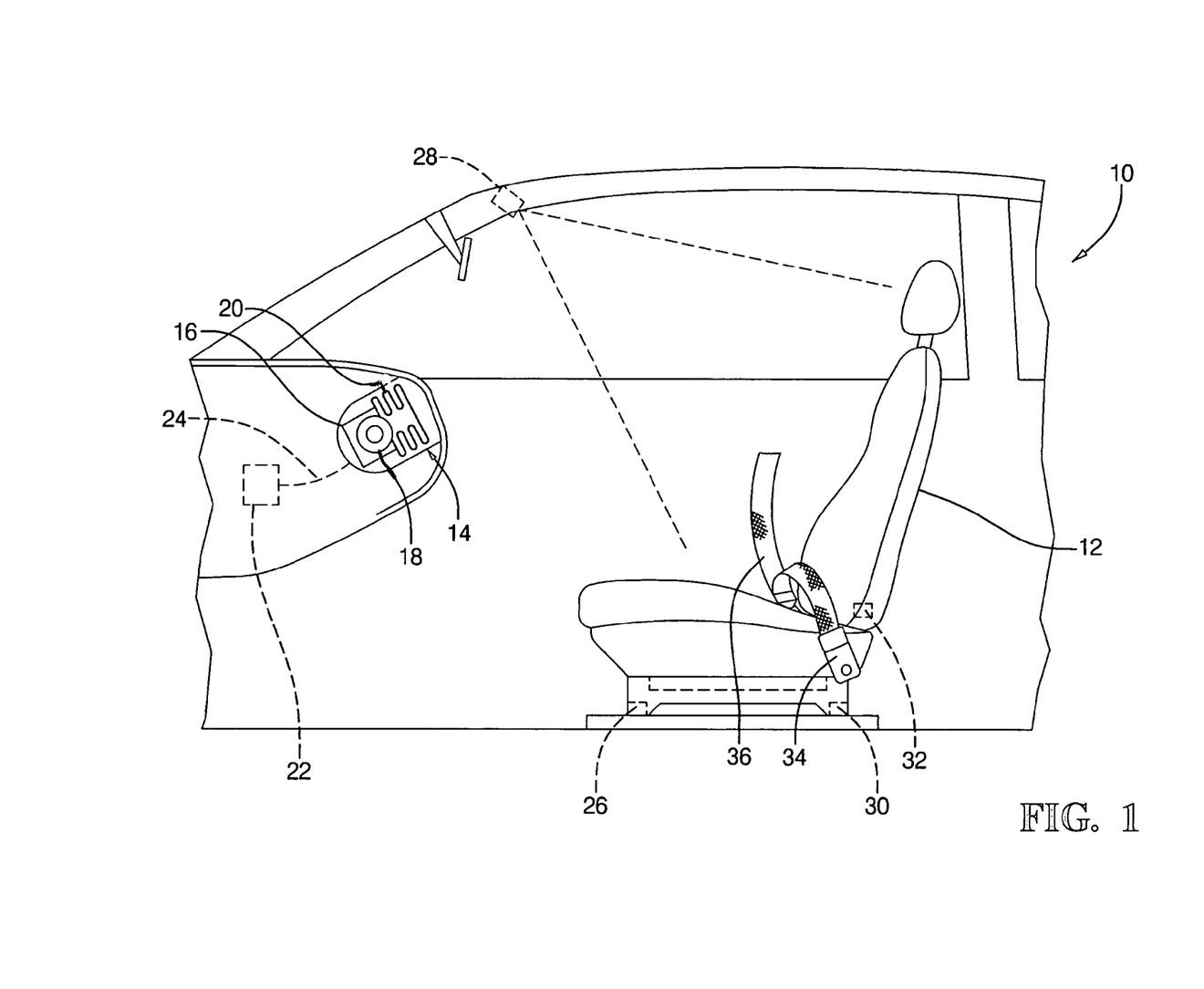
FIG. 1 is a partial view of a vehicle interior showing an air bag cushion in a stored or un-deployed state.
Figure 2:
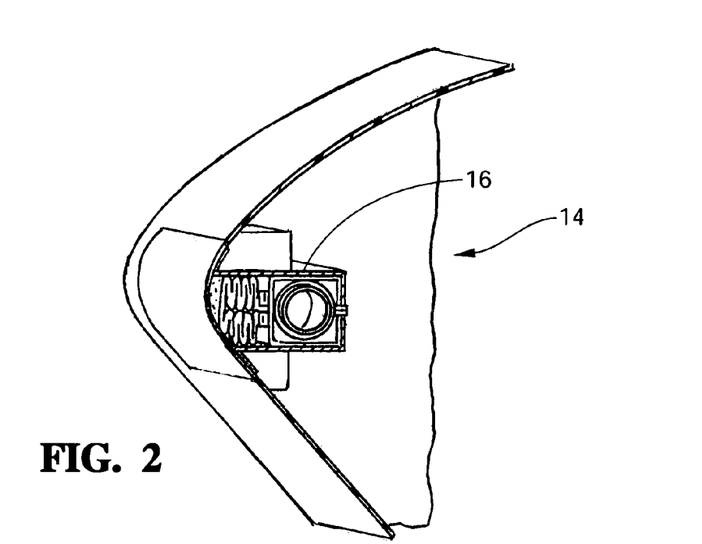
FIG. 2 is a partial cross-sectional view of an airbag module constructed in accordance with an exemplary embodiment of the present invention.

Referring now to the Figures, and in particular to FIG. 1 a portion of an interior of a vehicle 10 is illustrated. Included in the interior compartment of vehicle 10 is a seating structure 12 and an air bag module 14 disposed in a selected spatial relationship with respect to seating structure 12. The air bag module 14 comprises a housing 16, an inflator 18, and an inflatable air bag or cushion 20. The module 14 is positioned in the vehicle 10 for deployment of the cushion 20 towards the seating structure 12.

A sensor or sensing-and-diagnostic module 22 is adapted to detect an activation event wherein the occurrence of a threshold event will cause an activation signal 24 to be generated and received by the inflator 18, thereby causing the inflator to inflate the inflatable cushion. The detection of the threshold event is determined by one or more sensors that are disposed about the vehicle in accordance with known technologies. Thus, the activation signal 24 controls the activation of the airbag module 14. In an exemplary embodiment sensing-and-diagnostic module 22 comprises a microprocessor, microcontroller or other equivalent processing device capable of executing commands of computer readable data or program for executing a control algorithm that controls the operation of the airbag module. In order to perform the prescribed functions and desired processing, as well as the computations therefore (e.g., the execution of fourier analysis algorithm(s), the control processes prescribed herein, and the like), the controller may include, but not be limited to, a processor(s), computer(s), memory, storage, register(s), timing, interrupt(s), communication interfaces, and input/output signal interfaces, as well as combinations comprising at least one of the foregoing. For example, the controller may include input signal filtering to enable accurate sampling and conversion or acquisitions of such signals from communications interfaces. As described above, exemplary embodiments of the present invention can be implemented through computer-implemented processes and apparatuses for practicing those processes.

The inflatable cushion is stored in a folded or undeployed position in housing 16. The cushion is positioned to be in fluid communication with the inflator 18 wherein generation of the inflating gas will cause the cushion to inflate. Upon detection of an activation event by the sensing-and-diagnostic module 22, the inflator 18 is activated via signal 24 to generate the inflation gas. The inflation gas causes the cushion 20 to inflate and expand from housing 16 into the interior of the vehicle. It should be recognized that module 14 is illustrated by way of example only as being included in the dashboard of the vehicle. Of course, it is contemplated that module 14 can be installed for deployment in other regions of the vehicle, such as, but not limited to the steering wheel, the seat, the A-pillar, the roof, and other locations as well as other angular or positional relationships illustrated in FIG. 1. Moreover, the specific configurations of the vehicle interior, instrument panel, airbag module and relationship with regard to the same are provided as an example and it is, of course, understood that these configurations may vary from the specific configurations illustrated in FIG. 1.

Additionally, the present disclosure is also contemplated for use with various types of inflatable cushions and inflators. For example, cushions which are folded in a particular manner to achieve various deployment configurations and various types of inflators (e.g., dual stage inflators).

In addition, and in accordance with the alternative exemplary embodiments of the present invention, the sensing-and-diagnostic module can also be adapted to detect one or more conditions of the seating structure. For example, sensing-and-diagnostic module 22 can be adapted to detect one or more of the following: a load or amount of load (e.g., occupant weight) on the seating structure 12, a position of the seating structure, an angle of a portion of the seating structure with respect to another portion, the distance the seating structure is from the air bag module 14, and other data that is relevant to the deployment of the airbag by receiving input from a plurality of sensors disposed about the vehicle.

For example, the sensing-and-diagnostic module can receive inputs from one or more sensors such as, but not limited to, a seat position sensor 26, an optical scanner 28, a load sensor 30, a seat recline sensor 32, a seat belt use detection sensor 34, and a belt tensioning sensor (not shown). The sensors are positioned to provide input signals to module 22 indicative of one or more seat conditions. The one or more seat conditions combined with an occupant's size (e.g., weight determined by sensors) is inputted in a control algorithm resident upon a microprocessor disposed within the sensing and diagnostic module in order to determine a desired deployment scheme for the inflatable cushion. For example, the data inputs when compared to a look up table stored in the memory of the microprocessor or other readable format will allow the algorithm to determine whether a full deployment or partial deployment of the airbag is desired (e.g., tailoring of the airbag module by activating or not activating a system designed to modify the cushion deployment characteristics).

The continuous sampling of the various sensors allows the sensing and diagnostic module to be provided with various inputs before an activation event (deployment) occurs. It is noted that the airbag inflation system of the present disclosure is contemplated for use with any combination of the aforementioned sensors and it is not intended to be limited by the specific types of sensors discussed above.

The seat position sensor detects the position or distance of seating structure 12 with respect to air bag module 14. Similarly, the optical scanner 28 can be used to detect the position of seating structure 12. The load sensor 30 is disposed within the seating structure 12 and can be used to detect the load on the seating structure. Thus, sensor 30 is capable of detecting the specific weight or load on a portion of seating structure 12. The seat recline sensor 32 can be used to detect the degree or angle to which an upper or back portion of the seating structure 12 is reclined or positioned with respect to a lower or seat portion of seating structure 12. The seat belt use detection sensor 34 can determine whether the seat belt 36 is secured (e.g., buckled is inserted into its corresponding clasp). The seat belt tensioning sensor, alone or in combination with the load sensor 30, can also be used to determine the load on the seating structure 12.

In accordance with an exemplary embodiment of the present invention and referring now to FIGS. 2–12, inflation energy or gas input to the cushion is controlled by an inner deployable member 40, which causes a sensing device 42 to provide a signal to the sensing and diagnostic module or directly to the inflator. It is also noted that sensing device 42 may be used with any of the aforementioned sensors to provide inputs or signals to the sensing and diagnostic module or alternatively sensing device 42 may be the only device used to determine whether a second stage of the inflator is to be activated. In accordance with an exemplary embodiment the signal generated by sensing device 42 is provided to the sensing and diagnostic module for use in control logic wherein the sensing and diagnostic module provides an activation signal to the second initiator if the required signals are received by the sensing and diagnostic module.

In an exemplary embodiment, the inflator is a dual stage inflator having a first initiator 44 for providing a first low inflation stage and a second initiator 46 for use with the first initiator in order to provide a second inflation stage. In an exemplary embodiment first initiator 44 and second initiator 46 are pyrotechnic squibs that fire in response to an activation signal. Of course, other equivalent devices are contemplated to be within the scope of the present invention. In one exemplary embodiment, the second inflation stage provides a higher level of inflator output to the inflatable cushion than the first inflation stage. An example of the inflator output or pressures provided by only the first initiator are approximately 227 kilopascal (kPa), measured in a 60 liter tank, while the inflator output or pressure provided by only the second initiator are 432 kPa for a total combined pressure of 615 kPa. Such a dual stage inflator is designated as a (615 kPa/227 Kpa) which means if the primary initiator or first initiator is fired 227 kPa will be generated in the 60 liter tank and if both the primary and secondary are fired 615 kPa will be generated in the 60 liter tank. Of course, it is understood that the pressures (e.g., inflator gas output) associated with the first and second initiators may vary to levels greater and less than the aforementioned values. In addition, and in alternative exemplary embodiments the pressures provided by the first initiator and the second initiator may be equal or alternatively the pressures provided by the first initiator may be greater than the second initiator.

The variation of the inflator output provided by the first and second initiators and resulting inflating force of the inflating cushion may ultimately depend upon a variety of factors including the location of the airbag module within the vehicle and the possible locations of the vehicle seat. In an exemplary embodiment, the second inflation stage is provided to fully inflate the inflatable cushion to the configuration illustrated in FIG. 11. The gas volume delivered to the cushion (at a certain temperature and pressure) determines, in part, the force an inflating cushion will generate. Accordingly, the amount of force generated by the inflating cushion depends in part on the available volume as well as the inflator output and time after initial inflator activation. Exemplary embodiments of the present invention are directed to an inflatable or deployable member disposed within the inflatable cushion. The deployable member will be inflated when an activation signal is sent to the first initiator and the deployable member will provide an activation signal to the second initiator if the inflatable member is able to deploy in an unobstructed manner. If, however, the deployable member does not deploy in an unobstructed manner no activation signal will be sent to the second initiator and only the first initiator will be fired.

The air bag module includes an outer housing 16 for mounting to or proximate to an instrument panel or interior surface of a vehicle by suitable means such as fasteners. Of course, the module is contemplated for mounting to other structures in the vehicle. The housing is made of an easily molded or extruded rigid material such as plastic, steel, aluminum etc. As will be described in detail below, air bag module 14 comprises means to customize or tailor the inflation level of the inflatable cushion 20. The inflation level is commensurate with unobstructed deployment of the inflatable cushion. More specifically, and in accordance with an exemplary embodiment, deployable member 40 will deploy outwardly away from air bag module 14 in a first direction defined generally by arrow 48. Once deployable member reaches a full deployment defined by a distance "X" away from the airbag module, the fully and unobstructed deployment of deployable member 40 will cause sensing device 42 to generate a signal. The signal will indicate that deployable member has fully deployed or is unobstructed and the signal will cause second initiator 46 to fire thereby initiating the second stage of inflation wherein the inflatable cushion will reach its full deployment illustrated in FIG. 11.

In accordance with an exemplary embodiment, deployable member 40 will be fully inflated by the first low stage of inflation, which in one embodiment comprises approximately 30 percent of the overall inflator output generated by the inflator when both initiators are fired. Of course, the amount of inflator output corresponding to the first low inflation stage may vary to be greater or less than the aforementioned values. For example, the first low stage of inflation may comprise greater or less than 30 percent of the overall inflation output generated by the inflator if both initiators are fired. Other percentages include, but are not limited to, 50 percent of the overall inflation output of both initiators or, if applicable, greater than 50 percent of the overall inflation output or pressures provided by both initiators the inflator. In an exemplary embodiment both the inflatable cushion and the deployable member are made of a fabric material such as nylon or polyester.

Figure 3:
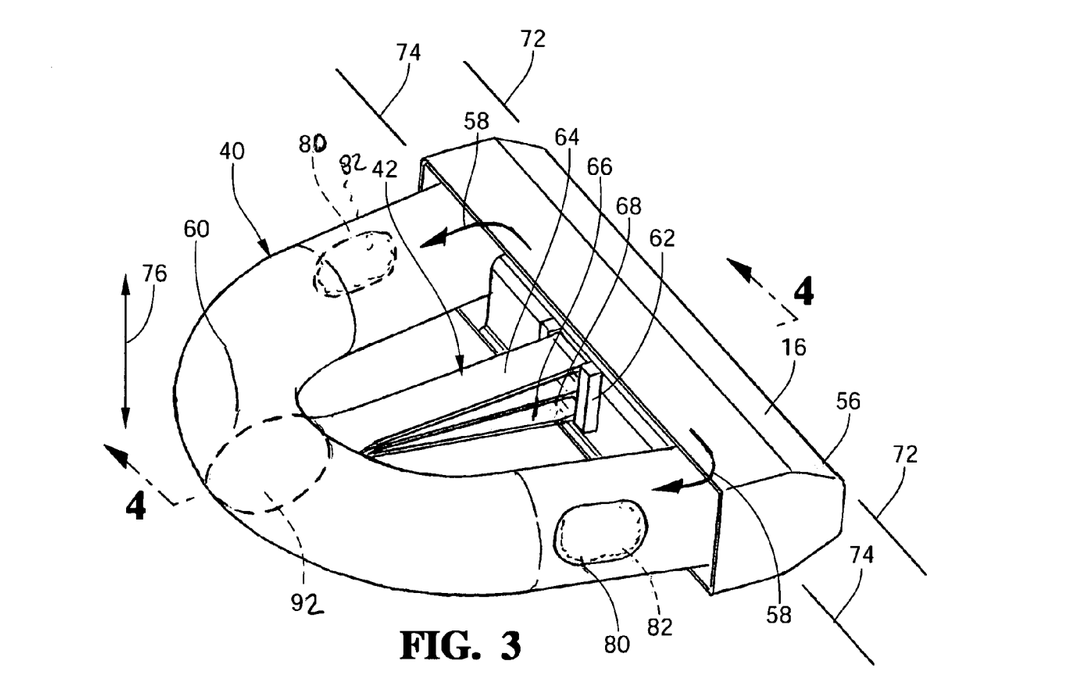
FIG. 3 is a perspective view of a deployable member for use in an airbag module in accordance with an exemplary embodiment of the present invention.

Referring back now to FIGS. 3–6, the inflatable cushion is mounted to housing 16 by a mounting member 50, which defines an inner area 52 for receiving inflator 18 therein. As illustrated, area 52 is open at either end and mounting member 50 comprises flange portions 54 that extend away from the openings into area 52. Flange portions 54 also provide a means for securing a portion of the deployable member to housing 16. The configuration of member 50 provides at least two functions, the first being the securement of the deployable member to the bottom wall 56 of the housing, while the second function is the providing or defining a fluid flow path into openings of the deployable member that are disposed on either side of the inflator, which is located within area 52. It is also noted that in accordance with an exemplary embodiment inflator 18 is capable of providing inflation gas at both ends of opening 52. Thus, inflation gas from inflator 18 is directed in the direction of arrows 58 (FIG. 3). Accordingly, mounting member 50 provides a means for securing inflator 18 and deployable member 40 to housing 16 as well as defining fluid flow paths for deployable member 40.

Another feature of the dual inflation paths provided by member 50 and inflator 18 is that when the forward portion of the deployable member is deflected inwardly (FIG. 9) inflation paths remained unobstructed for the inflation gases of the first stage of inflation. This is provided by mounting a portion of the deployable member to the bottom wall as well as providing and defining the flow paths with flanges 54, which depend away from the openings of area 52.

Figure 4:
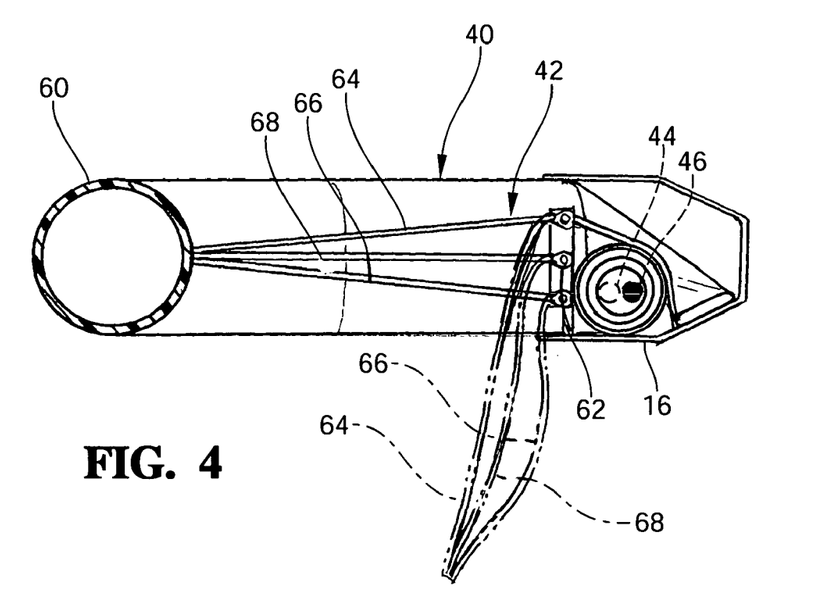
FIG. 4 is a view along lines 4—4 of FIG. 3.
Figure 5:
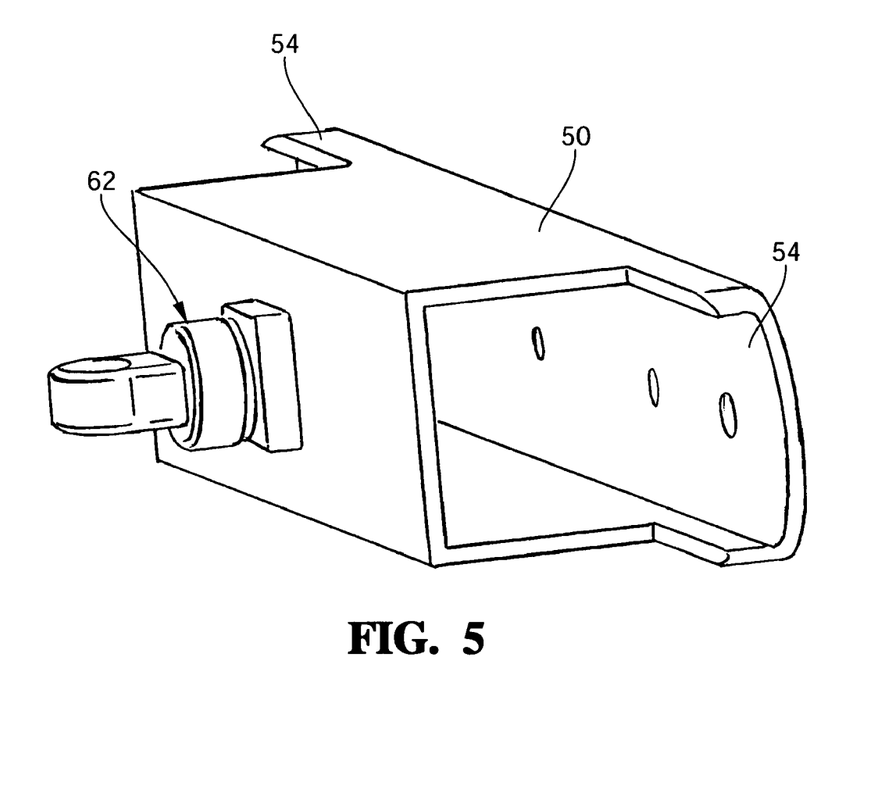
FIG. 5 is a perspective view of a component part of an airbag module constructed in accordance with an exemplary embodiment of the present invention.
Figure 6:
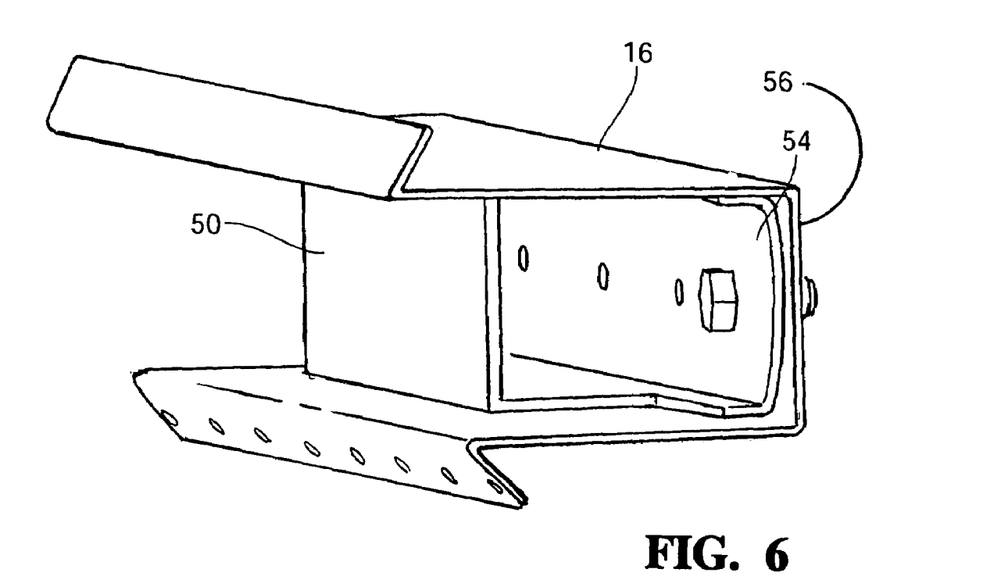
FIG. 6 is a perspective view of component parts of an airbag module constructed in accordance with an exemplary embodiment of the present invention.
Figure 7:
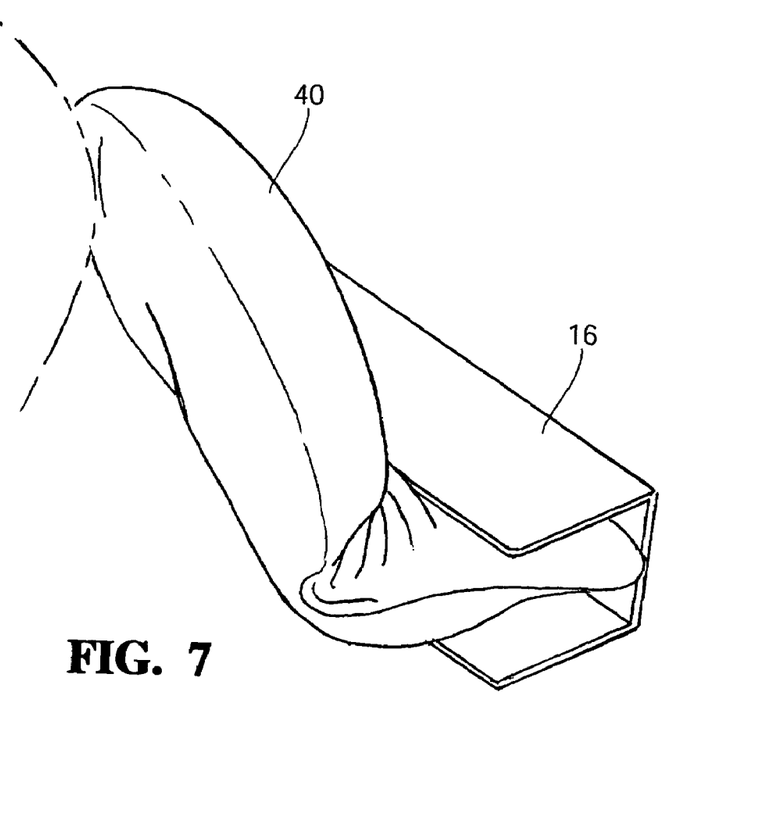
FIGS. 7–10 illustrate obstructed deployment of the deployable member.
Figure 8:
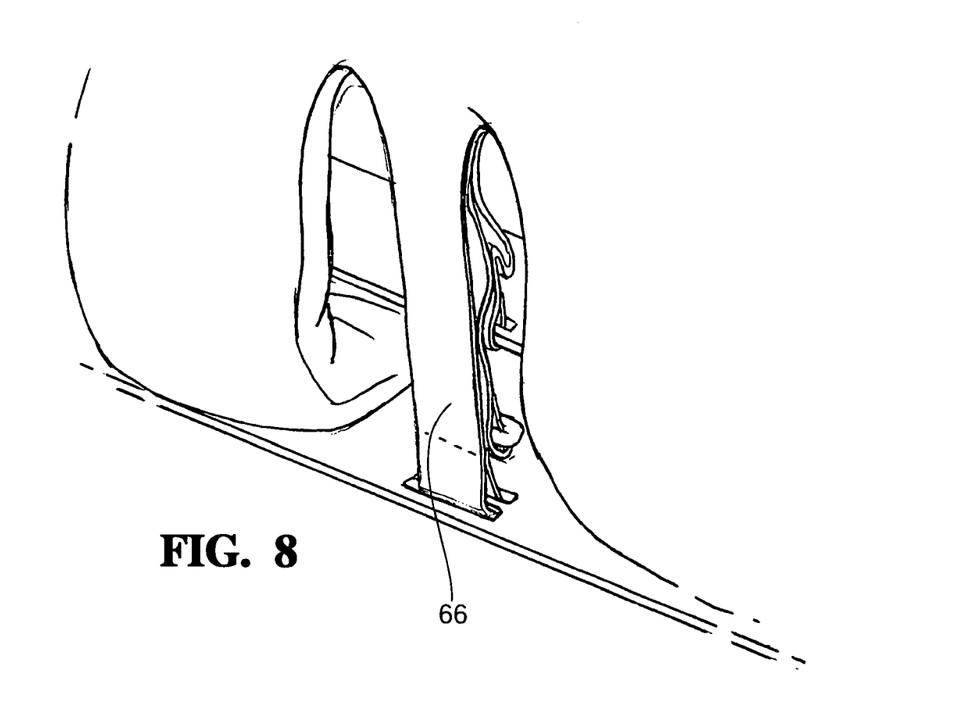

Referring now to FIGS. 3 and 4 a fully inflated deployable member 40 is illustrated. As shown deployable member 40 comprises an inflatable structure with a forward end 60, which in accordance with an exemplary embodiment projects outwardly in a first direction as deployable member 40 is inflated in accordance with a first stage of inflation provided by inflator 18. As illustrated in FIGS. 3 and 4, deployable member 40 is in an unobstructed deployment configuration. Upon reaching this deployment configuration sensing device 42 will cause a signal to be generated by a sensing element 62. In accordance with an exemplary embodiment, sensing device 42 comprises an upper tether 64, a lower tether 66 and a central tether 68. Each of the aforementioned tethers are secured to the deployable member proximate to forward portion 60 and center tether 68 is shorter than upper and lower tethers 64 and 66 such that when deployable member 40 reaches the configuration illustrated in FIGS. 3 and 4, central tether 68 will provide a pulling force to sensing element 62 such that a signal will be generated to cause the second initiator and ultimately the second stage of inflation to occur. Conversely, and if sensing element 62 does not generate such a signal the second initiator and the second stage of inflation will not occur. Therefore, unobstructed deployment of deployable member 40 must occur before initiation of the second stage of inflation.

Figure 9:
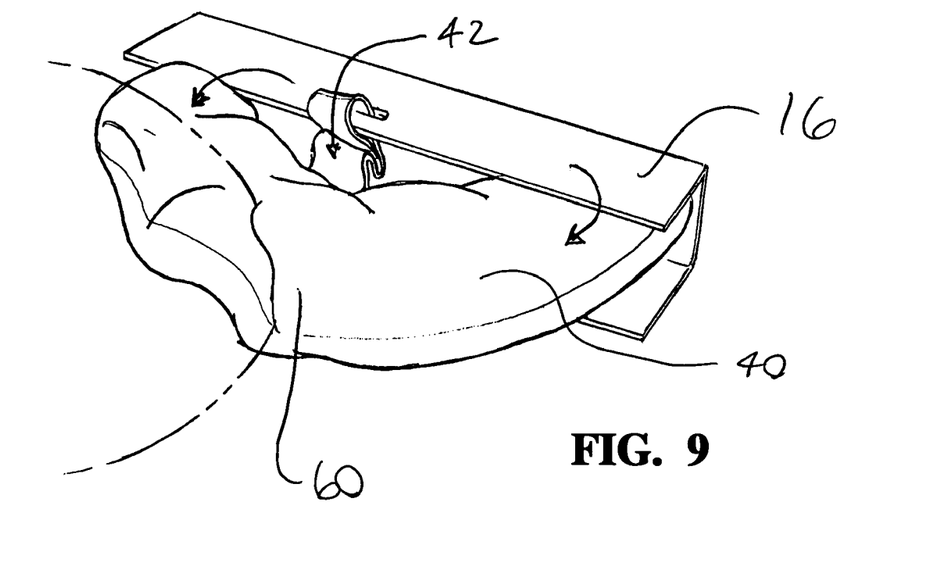
Figure 10:
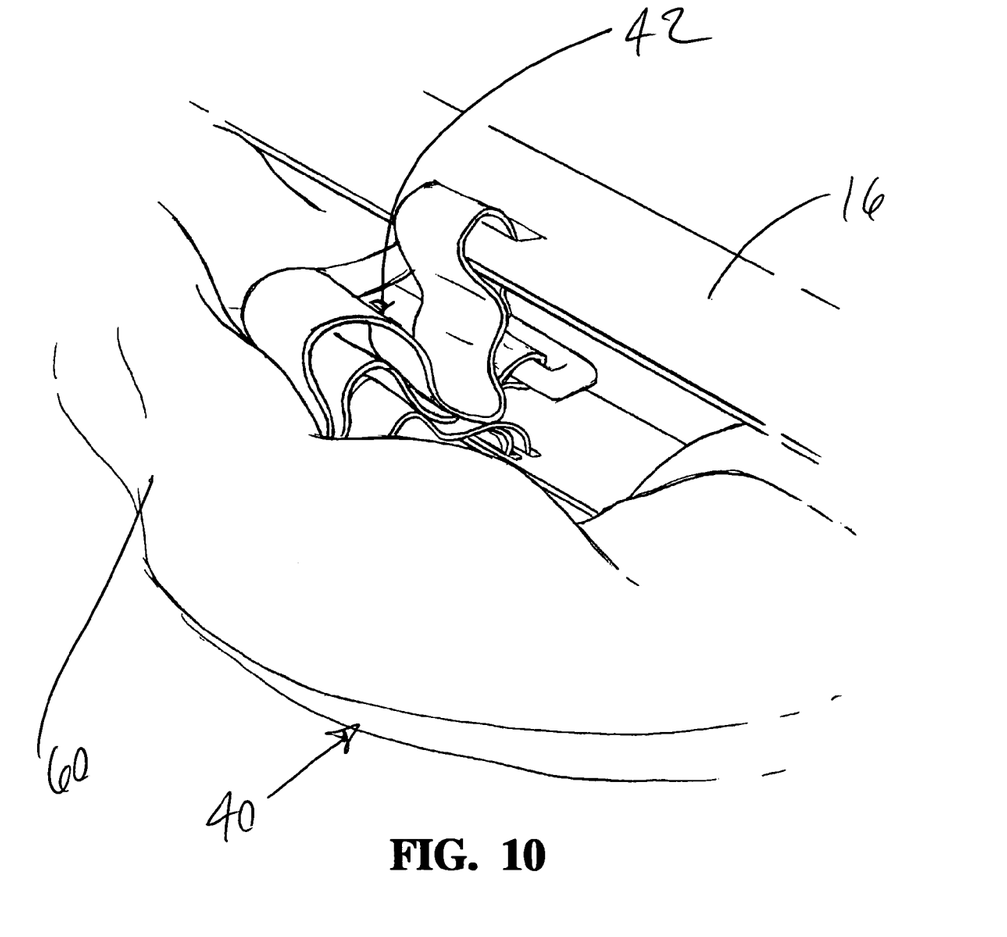

Referring now to FIGS. 7–10 various configurations of obstructed deployment of deployable member 40 are illustrated. For example and referring now to FIG. 7, deployable member 40 is illustrated as being deflected upwardly away from the first direction. When this occurs lower tether 66 will become taught and center tether 68 as well as upper tether 64 will not be pulled to their full length. More particularly, center tether 68 will not provide a pulling force on sensing element 62. Accordingly, no signal will be provided to the second initiator of the inflator. This feature of no signal being generated by upward or downward positioning of deployable member 40 is provided by the three tether arrangement of sensing element 42 or more particularly the securement locations of the tethers about the sensing element. For example, and referring now to FIG. 4 downward deployment of deployable member 40 is illustrated by dashed lines of sensing device 42. Therefore, the lengths and securement locations of tethers 64, 66 and 68 of sensing device 42 provide a means for determining whether deployable member 40 has fully deployed in substantially the first direction indicated by arrow 48. If this deployment stage does not occur no signal will be sent to the inflator to cause the second stage of inflation to be produced. Referring now to FIGS. 9 and 10 other obstructed deployment of deployable member 40 is illustrated. Here forward portion 60 is deflected inwardly and accordingly the tethers of sensing device 42 are not completely unfurled and therefore no tension is applied to sensing element 62 by central tether 68. Again, this configuration illustrates an obstructed deployment of deployable member 40 which will prevent a signal to be sent to the inflator to cause the second stage of inflation.

Referring back now to FIG. 3 another aspect of an exemplary embodiment of the present invention is illustrated. As previously mentioned, mounting member 50 provides a means for securing a portion of deployable member 40 to the bottom wall 56 of the airbag module housing 16. This point of securement is illustrated by lines 72 in contrast to a line of securement 74, which would correspond to deployable member 40 being secured proximate to the opening of the housing 16. By locating the point of securement at bottom wall 56, deployable member 40 is provided with greater rigidity during deployment and is less susceptible to being deployed downwardly or upwardly in the directions of arrows 76 unless a deflecting or intervening force is applied to a portion of deployable member 40. It is this deflecting or intervening force that exemplary embodiments of the present intention are designed to detect and accordingly prevent a second stage of inflation from occurring if such movement is detected.

Figure 11:
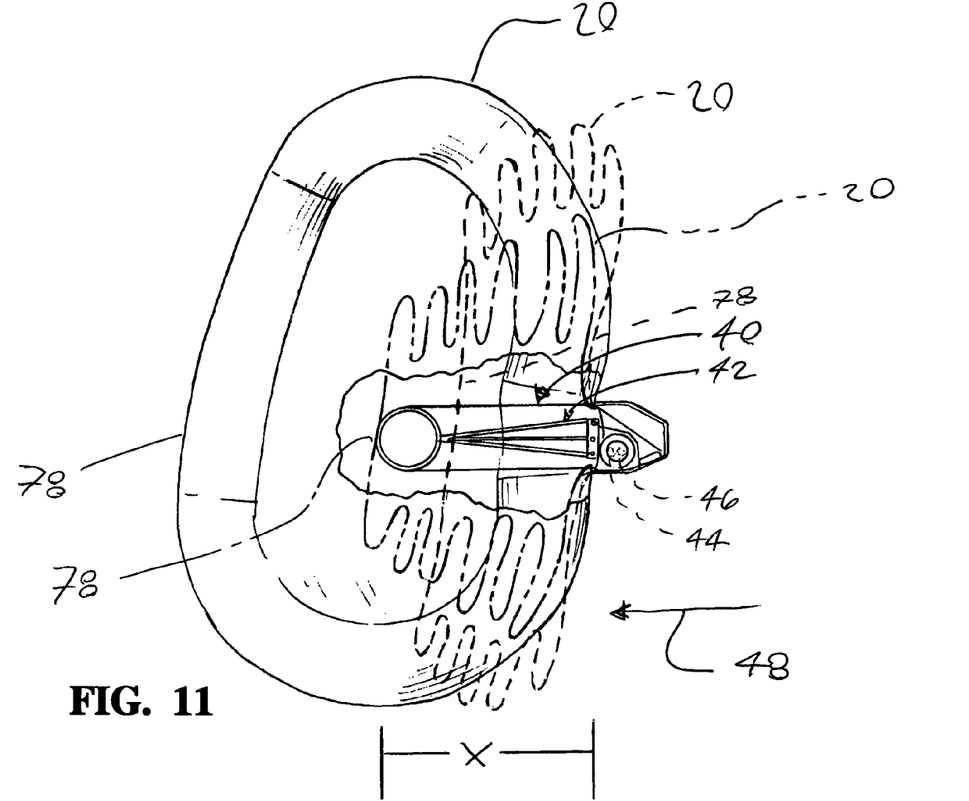
FIG. 11 is a cross-sectional view of deployment stages of an air bag device constructed in accordance with exemplary embodiments of the present invention.

Referring now to FIG. 11, two stages of deployment of inflatable cushion 20 are illustrated. In the first stage, which corresponds to deployable member 40 being fully deployed and the first initiator of the inflator providing the first inflator output to deployable member 40 and inflatable cushion 20, a leading edge or forward portion 78 of inflatable cushion 20 is pushed further forward in the direction of arrow 48 as deployable member 40 or forward portion 60 causes forward portion 78 of the inflatable cushion to move outwardly. This displacement occurs faster than if no deployable member 40 was disposed within inflatable cushion 20 since deployable member 40 pushes the leading edge of the inflatable cushion out first. An example of such configuration is illustrated by the dashed lines of inflatable cushion 20 in FIG. 11. For purposes of explanation and illustrating the greater forward deployment of the forward portion 78 with deployable member 40, the dashed lines corresponding to forward portion 78 are intended to represent the location of forward portion 78 of inflatable cushion 20 without a deployable member 40 positioned within the inflatable cushion as opposed to the location of forward portion 78 with deployable member disposed therein. Each of these positions are intended to illustrate where forward portion 78 would be located at the same time period after initial initiation by the inflator. As illustrated, the inflatable cushion without the deployable member disposed therein will not reach as far in the "X" direction at the same time after initial inflation as opposed to the inflatable cushion with deployable member 40 disposed therein. Accordingly, deployable member 40 causes forward portion 78 to move further away from the housing during an initial period of inflation as well as providing a means for determining whether deployable member 40 has been obstructed. If the deployable member 40 is allowed to deploy to its full configuration, sensing element 62 provides a signal to the inflator causing the second initiator 46 to fire and thereby fully inflate inflatable cushion 20 to the fully inflated configuration illustrated in FIG. 11.

As illustrated and when inflatable cushion 20 reaches its full inflation configuration, forward portion 78 of inflatable cushion 20 is disposed in a spaced relationship with regard to forward portion 60 of deployable member 40.

In accordance with an exemplary embodiment of the present invention, deployable member 40 provides an inflatable proximity sensor that fully deployed as when a first stage of the inflator is activated. In accordance with an exemplary embodiment, this occurs approximately 5 ms after the initial activation of the inflator. At approximately 10 ms after the initial activation of the inflator, and if sensing element 62 provides the appropriate signal, the second stage is fired wherein full deployment of the inflatable cushion occurs. It is, of course, understood that the aforementioned time periods are provided as non-limiting examples and the present invention is intended to be used with time periods greater or less than the aforementioned values. In addition, it is also understood that the microprocessor of the sensing and diagnostic module may, in an alternative embodiment, have logic for determining and providing the time delays between the first and second stages of inflation, wherein such timing or time periods between the first stage and the second stage may wary the total outputs of the initiators and the inflator.

In addition, and referring back now to FIG. 3, deployable member 40 is also configured to have venting apertures 80, which will define fluid paths for inflation gases to flow through and ultimately inflate inflatable cushion 20. In one embodiment, the apertures maybe covered with deployable flap portions 82 that are configured to open by means of breakaway stitching when a certain pressure is reached within deployable member 40. Alternatively, venting apertures 80 maybe always open or a permeable material is positioned over apertures 80. The function of apertures 80 is to provide a fluid path for inflation of inflatable cushion 20. Thus, the usage of flaps or breakaway stitching or permeable members may ultimately depend upon the inflation output provided by the first initiator and the second initiator of the inflator as well as the configurations of deployable member 40 and inflatable cushion 20. In yet another alternative embodiment separate inflation paths may be provided for both the inflatable cushion and the deployable member disposed therein.

Figure 12:
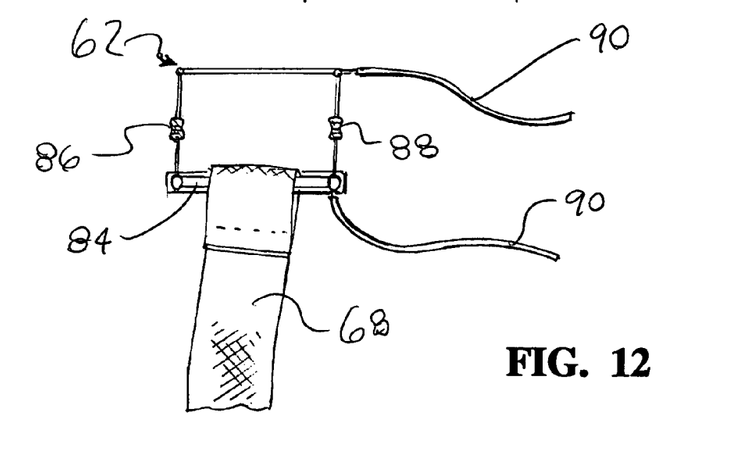
FIG. 12 illustrates portions of a sensing device contemplated for use in exemplary embodiments of the present invention.

Referring to FIG. 12, an example of sensing element 62 is illustrated; here center tether 68 is secured to a conductive member 84. Conductive member 84 is configured to break or tear such that it no longer provides an electrical path between a first resistor 86 and a second resistor 88, which are connected in parallel by electrical connectors 90. Accordingly, when conductive member 84 provides an electrical path between first resistor 86 and second resistor 88 a known resistance is provided. However, when deployable member 40 reaches an unobstructed deployment configuration, a force is applied to conductive member 84 such that the conductive path between first resistor 86 and second resistor 88 is no longer available. Accordingly, the resistance encountered by electrical connectors 90 will be equal to that of second resistor 88. Therefore, control logic of the sensing and diagnostic module can be easily configured to determine whether conductive member 84 has been severed. For example, if each of the resistors has the same resistance, severing of conductive member 84 will cause the resistance to double. In addition, sensing and diagnostic module can easily determine whether the power has been cut or there is a short-circuit in the system. In each of these cases the control logic of the sensing and diagnostic module will be configured to provide an appropriate output signal. It is, of course, understood that the aforementioned illustration of sensing element 62 is provided as a non-limiting example and any other means for providing an output signal in response to a force received by central tether 68 is contemplated to be within the scope of the present invention.

Figure 13:
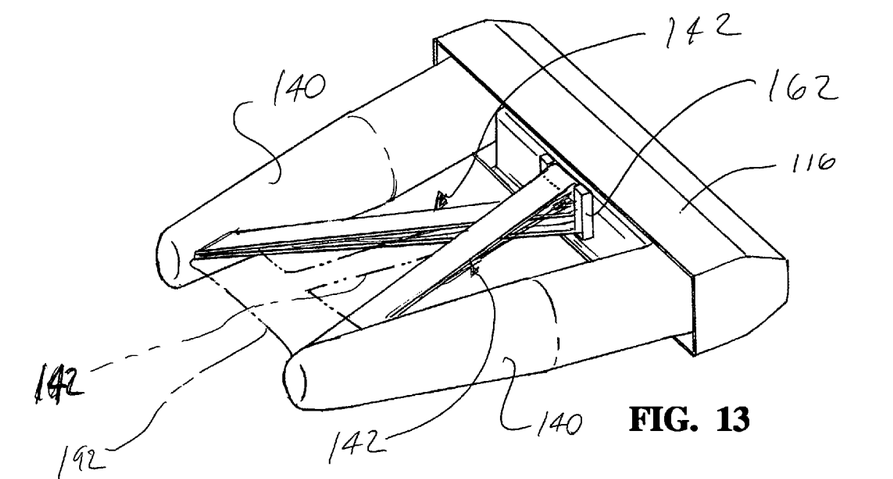
FIG. 13 is a perspective view of a deployable member for use in an airbag module in accordance with an alternative exemplary embodiment of the present invention.

Referring now to FIG. 13 an alternative exemplary embodiment of the present invention is illustrated here deployable member 40 is replaced by a pair of deployable arms 140 each having their own sensing device 142 wherein a plurality of tethers are positioned to provide force to a sensing element 162 upon unobstructed deployment of deployable members 140. In yet another alternative embodiment, and as illustrated by the dashed lines in FIG. 13, a non-inflatable member 192 is secured between the forward ends of deployable members 140 and a single sensing device 142 is secured between non-inflatable member 192 and sensing element 162, wherein signals or lack thereof are generated during deployment of deployable members 140, which corresponds to an initial stage of deployment of the inflatable cushion of the airbag device. In yet another alternative embodiment deployable member 40 (FIG. 3) comprises a non-inflatable portion 92 (illustrated by the dashed lines in FIG. 3), which separates deployable member 40 into two discrete chambers that are inflated at opposite ends of the inflator or inflator housing.

In yet another alternative embodiment, it is contemplated that sensing elements 62 will provide a signal to a venting device as opposed to the second initiator wherein a single stage inflator is used and a signal is provided to open a vent in the housing. In yet another alternative embodiment, the signal is provided to both a second initiator and a venting device to provide various means for modifying the inflator output of the airbag module.

Figure 14:
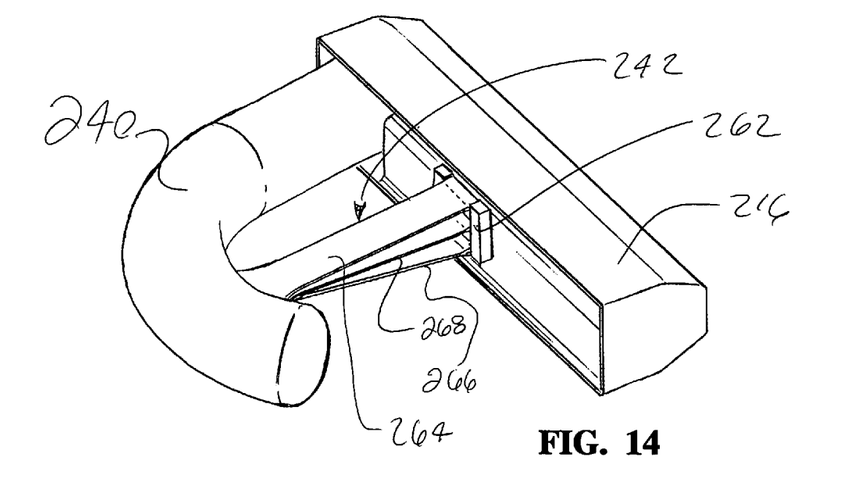
FIG. 14 is a perspective view of a deployable member for use in an airbag module in accordance with another alternative exemplary embodiment of the present invention.

In yet another alternative exemplary embodiment, and referring now to FIG. 14 here deployable member 40 is replaced by a deployable arm 240 having an arcuate or curved shape. It this embodiment the deployable arm has only one inflation opening and a sensing device 242 is secured to a forward sealed end of the deployable member. In yet another alternative embodiment a pair of deployable arms is contemplated each having their inflation openings disposed on either end of the housing 216 and each having their own sensing device wherein one of the curved deployable members sweeps outwardly in one direction during inflation and the other deployable member sweeps out in an opposite direction.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An air bag device, comprising:
   an inflatable cushion being configured for deployment from said air bag device;
   an inflator for inflating said inflatable cushion, said inflator being in fluid communication with said inflatable cushion, said inflator comprising a first initiator for initiating a first stage of inflation and a second initiator for use with said first initiator for initiating a second stage of inflation, said first stage of inflation providing a first inflation output to said inflatable cushion; and
   a deployable member disposed within said inflatable cushion, said deployable member being in fluid communication with said inflator, wherein said first stage of inflation causes said deployable member to deploy in a first direction;
   a sensing device operably coupled to said deployable member, said sensing device further comprising a sensing element that provides a signal to a sensing and diagnostic module wherein said sensing and diagnostic module provides said activation signal to said second initiator when said deployable member deploys in an unobstructed manner;
   wherein unobstructed deployment of said deployable member in said first direction will cause an activation signal to be sent to said second initiator to initiate said second stage of inflation, wherein said sensing device further comprises a tether that is secured to a forward end of said deployable member at one end and said sensing element at the other end wherein the distance between said forward end and said sensing element during unobstructed deployment of said deployable member is longer than said tether and said tether provides a force to said sensing element causing said activation signal to be sent to second initiator.

2. The air bag device as in claim 1, wherein deployment of said deployable member in said first direction causes a leading edge of said inflatable cushion to reach a maximum distance from the air bag device prior to said second stage of inflation, said maximum distance of said leading edge being defined by the configuration of said deployable member.

3. The air bag device as in claim 2, wherein said maximum distance of said leading edge is reached faster than said inflatable cushion being inflated without said deployable member disposed therein.

4. An air bag device, comprising:
an inflatable cushion being configured for deployment from said air bag device;
an inflator for inflating said inflatable cushion, said inflator being in fluid communication with said inflatable cushion, said inflator comprising a first initiator for initiating a first stage of inflation and a second initiator for use with said first initiator for initiating a second stage of inflation, said first stage of inflation providing a first inflation output to said inflatable cushion, and
a deployable member disposed within said inflatable cushion, said deployable member being in fluid communication with said inflator, wherein said first stage of inflation causes said deployable member to deploy in a first direction;
wherein unobstructed deployment of said deployable member in said first direction will cause an activation signal to be sent to said second initiator to initiate said second stage of inflation; and
a sensing device operably coupled to said deployable member, said sensing device further comprising an upper tether, a lower tether and a central tether, said central tether being secured to a forward end of said deployable member at one end and said sensing element at the other end and said lower tether and said upper tether are each secured to forward portions of said deployable member at one end and a portion of the air bag device at the other end, wherein the distance between said forward end and said sensing element during unobstructed deployment of said deployable member is longer than said central tether and during unobstructed deployment of said deployable member said central tether provides a force to said sensing element causing said activation signal to be sent to said second initiator, and said upper tether and said lower tether are each longer than said central tether, wherein either said upper or said lower tether will prevent said central tether from providing a force to sand sensing element when said deployable member fully deploys in a direction other than said first direction.

5. An air bag device, comprising:
an inflatable cushion being configured for deployment from said air bag device;
an inflator for inflating said inflatable cushion, said inflator being in fluid communication with said inflatable cushion, said inflator comprising a first initiator for initiating a first stage of inflation and a second initiator for use with said first initiator for initiating a second stage of inflation, said first stage of inflation providing a first inflation output to said inflatable cushion; and
a deployable member disposed within said inflatable cushion, said deployable member being in fluid communication with said inflator, wherein said first stage of inflation causes said deployable member to deploy in a first direction;
wherein unobstructed deployment of said deployable member in said first direction will cause an activation signal to be sent to said second initiator to initiate said second stage of inflation; and
a diffusing member disposed about said inflator, said diffusing member providing an extension at both ends of said inflator, said extensions causing a portion of said deployable member to be positioned away from said inflator.

6. The air bag device as in claim 5, wherein said diffusing member secures a rearward portion of said deployable member behind said inflator such that said inflator is disposed within said deployable member.

7. The air bag device as in claim 6, wherein said deployable member is a tubular member having a first end portion and a second end portion, said first end portion being secured to one end of said inflator and said second end portion is secured to the other end of said inflator, wherein a portion of said tubular member disposed between said first end and said second end deploys in said first direction.

8. An air bag module, comprising:
a housing;
an inflatable cushion being configured for deployment from said housing;
an inflator for inflating said inflatable cushion, said inflator being in fluid communication with said inflatable cushion, said inflator comprising a first initiator for initiating a first stage of inflation and a second initiator for use with first said initiator for initiating a second stage of inflation, said first stage of inflation providing a first inflation output to said inflatable cushion;
a deployable member disposed within said inflatable cushion, said deployable member being in fluid communication with said inflator, wherein said first stage of inflation causes said deployable member to deploy in a first direction; and
a securement member disposed about said inflator, said securement member securing said deployable member to said housing; wherein unobstructed deployment of said deployable member in said first direction will cause an activation signal to be sent to said second initiator to initiate said second stage of inflation and, wherein said deployable member is a tubular member having a first end portion and a second end portion, said first end portion being secured to one end of said inflator and said second end portion is secured to the other end of said inflator, wherein a portion of said tubular member disposed between said first end and said second end deploys in said first direction, wherein said inflator provides an inflation output to said first end portion and said second end portion and said securement member positions said first end portion and said second end portion away from said inflator.

9. An air bag module, comprising:
a housing;
an inflatable cushion being configured for deployment from said housing;
an inflator for inflating said inflatable cushion, said inflator being in fluid communication with said inflatable cushion, said inflator comprising a first initiator for initiating a first stage of inflation and a second initiator for use with said first initiator for initiating a second stage of inflation, said first stage of inflation providing a first inflation output to said inflatable cushion;

a deployable member disposed within said inflatable cushion, said deployable member being in fluid communication with said inflator, wherein said first stage of inflation causes said deployable member to deploy in a first direction; and a securement member disposed about said inflator, said securement member securing said deployable member to said housing; wherein unobstructed deployment of said deployable member in said first direction will cause an activation signal to be sent to said second initiator to initiate said second stage of inflation; and a sensing device operably coupled to said deployable member, said sensing device further comprising an upper tether, a lower tether and a central tether, said central tether being secured to a forward end of said deployable member at one end and said sensing element at the other end and said lower tether and said upper tether are each secured to forward portions of said deployable member at one end and a portion of the airbag module at the other end, wherein the distance between said forward end and said sensing element during unobstructed deployment of said deployable member is longer than said central tether and during unobstructed deployment of said deployable member said central tether provides a force to said sensing element, said sensing element generating an activation signal, wherein said activation signal is directly sent to said second initiator, and said upper tether and said lower tether are each longer than said central tether, wherein either said upper or said lower tether will prevent said central tether from providing a force to said sensing element when said deployable member fully deploys in a direction other than said first direction.

10. An air bag module, comprising:

a housing;

an inflatable cushion being configured for deployment from said housing;

an inflator for inflating said inflatable cushion, said inflator being in fluid communication with said inflatable cushion, said inflator comprising a first initiator for initiating a first stage of inflation and a second initiator for use with said first inflator for initiating a second stage of inflation, said first stage of inflation providing a first inflation output to said inflatable cushion;

a deployable member disposed within said inflatable cushion, said deployable member being in fluid communication with said inflator, wherein said first stage of inflation causes sand deployable member to deploy in a first direction; and a securement member disposed about said inflator, said securement member securing said deployable member to said housing, wherein unobstructed deployment of said deployable member in said first direction will cause an activation signal to be sent to said second initiator to initiate said second stage of inflation; and a sensing device operably coupled to said deployable member, said sensing device further comprising an upper tether, a lower tether and a control tether, said control tether being secured to a forward end of said deployable member at one end and said sensing element at the other end and said lower tether and said upper tether are each secured to forward portions of said deployable member at one end and a portion of the airbag module at the other end, wherein the distance between said forward end and said sensing element during unobstructed deployment of said deployable member is longer than said central tether and during unobstructed deployment of said deployable member said central tether provides a force to said sensing element causing a signal to be sent to a sensing and diagnostic module wherein said sensing and diagnostic module provides said activation signal to said second initiator in response to said signal, and said upper tether and said lower tether are each longer than said central tether, wherein either said upper or said lower tether will prevent said central tether from providing a force to said sensing element when said deployable member fully deploys in a direction other than said first direction.

11. A proximity detection device disposed within an inflatable cushion of an air bag module, the proximity detection device comprising:

an inflatable member; and a sensing device operably coupled to said inflation member, said sensing device comprising a tether that is secured to al forward end of said inflatable member at one end and a sensing element at the other end wherein the distance between said forward end and said sensing element during unobstructed deployment of said deployable member in a first direction is longer than said tether and said tether provides a force to said sensing element causing a signal to be generated when said inflatable member deploys in an unobstructed manner in said first direction.

12. The proximity detection device as in claim 11, wherein said sensing device further comprising an upper tether and a lower tether, said lower tether and said upper tether are each secured to forward portions of said inflatable member at one end and a portion of the air bag module at the other end, wherein said upper tether and said lower tether are each longer than said tether, wherein either said upper tether or said lower tether will prevent said tether from providing said force to said sensing element when said inflatable member fully deploys in a direction other than said first direction.

13. The proximity detection device as in claim 11, wherein said forward end comprises an un-inflated portion of said inflatable member.

14. The proximity detection device as in claim 13, wherein said un-inflated portion defines two separate inflation chambers of said inflatable member.

15. A proximity detection device disposed within an inflatable cushion of an air bag module, the proximity detection device comprising:

a pair of inflatable members;

a sensing device operable coupled to each of said pair of inflatable members, each sensing device comprising a tether that is secured to a forward end of one of said pair of inflatable members at one end and a sensing element at the other end wherein the distance between said forward end of said pair of inflatable members and said sensing element during unobstructed deployment of said pair of inflatable members in a first direction is longer than said tether and said tether provides a force to said sensing element causing a signal to be generated when said inflatable member deploys in an unobstructed manner in said first direction.

16. A method for determining whether a portion of an inflatable cushion is obstructed during deployment, the method comprising:

provading an inflator for inflating said inflatable cushion, said inflator having a first initiator for initiating a first stage of inflation and a second initiator for use with said first initiator for initiating a second stage of inflation, said first stage of inflation providing a first inflation output to said inflatable cushion;

deploying a proximity detection device in a first direction during said first stage of inflation, said proximity detection device being disposed within said inflatable cushion, and being in fluid communication with said inflator, said proximity detection device comprising an inflatable member, and a sensing device operably coupled to said inflatable member, said sensing device comprising a tether that is secured to a forward end of said inflatable member at one end and a sensing element at the other end wherein the distance between said forward end and said sensing element during unobstructed deployment of said deployable member in the first direction is longer than said tether and said tether provides a force to said sensing element causing an activation signal to be generated when said inflatable member deploys in an unobstructed manner in said first direction; and providing the activation signal to said second initiator to initiate said second stage of inflation, wherein said activation signal is only provided if said deployable member deploys unobstructed in said first direction.

17. A proximity detection device disposed within an inflatable cushion of an air bag module, the proximity detection device comprising:

an inflatable member;

a sensing device operably coupled to said inflatable member, said sensing device comprising a tether that is secured to a forward end of said inflatable member at one end and a sensing element at the other end wherein the distance between said forward end of said inflatable member and said sensing element during unobstructed deployment of said inflatable member in a first direction is longer than said tether and said tether provides a force to said sensing element causing a signal to be generated when said inflatable member deploys in an unobstructed manner in said first direction, wherein said inflatable member has an arcuate shape when inflated and said forward end is proximate to an end of said arcuate shape.

18. The proximate detection device as in claim 17, wherein said inflatable member comprises a single inflation opening disposed at an end of said arcuate shape opposite said forward end.

* * * * *